United States Patent
Yamamuro et al.

[15] 3,663,108
[45] May 16, 1972

[54] APPARATUS FOR MEASURING THE DIMENSIONS OF OBJECTS WHICH INCLUDES A CARRIER WHICH TRAVELS ACROSS THE OBJECTS TO BE MEASURED

[72] Inventors: Hiroshi Yamamuro, Yokohama; Akira Kawase, Tokyo; Akio Sakai, Kawasaki, all of Japan

[73] Assignee: Tokyo Shibaura Electric Co., Ltd., Kawasaki-shi, Japan

[22] Filed: Apr. 16, 1970

[21] Appl. No.: 29,230

[30] Foreign Application Priority Data

Apr. 16, 1969 Japan..................................44/28959

[52] U.S. Cl............................................356/160, 73/37.5
[51] Int. Cl.................................G01b 11/04, G01b 13/08
[58] Field of Search...............................73/37.5–37.7, 159; 356/159, 160; 250/219 WD

[56] References Cited

UNITED STATES PATENTS

| | | | |
|---|---|---|---|
| 3,541,337 | 11/1970 | Brandenburg | 250/219 WD |
| 3,555,288 | 1/1971 | Sundsuall | 250/219 WD |

Primary Examiner—William L. Sikes
Assistant Examiner—Orville B. Chew, II
Attorney—Oblon, Fisher and Spivak

[57] ABSTRACT

An apparatus for measuring the width of a web material includes a carrier which travels across the web. The carrier has mounted thereon a photoelectric transducer and a magnetic induction type pulse generator for enabling exact detection of the opposite edge portions of the web. An elongated magnetically recorded fixed scale extends through the entire travel span of the carrier and is magnetically coupled to the pulse generator. The scale includes finely distributed magnetically recorded marks on the magnetic base thereof, along the lengthwise direction of said scale. A counter counts the pulses which emanate from the pulse generator in the absence of a detected electric signal from the photoelectric transducer, the absence indicating the presence of the web such that the opposite edge portions of the web are readily detected and measurement of the web width made.

4 Claims, 8 Drawing Figures

INVENTORS
HIROSHI YAMAMURO
AKIRA KAWASE
AKIO SAKAI

BY Oblon, Fisher & Spivak
ATTORNEYS

INVENTORS
HIROSHI YAMAMURO
AKIRA KAWASE
AKIO SAKAI

BY

Oblon, Fisher & Spivak

ATTORNEYS

APPARATUS FOR MEASURING THE DIMENSIONS OF OBJECTS WHICH INCLUDES A CARRIER WHICH TRAVELS ACROSS THE OBJECTS TO BE MEASURED

BACKGROUND OF THE INVENTION

1. Field Of The Invention

The present invention relates to an apparatus for measuring the dimensions of objects, and more particularly to an apparatus for measuring the width of successively fed web materials.

2. Prior Art

By way of example, in a rolling mill process for relatively thick steel sheets there is a demand for a way of readily and easily measuring the width of successively rolled steel sheets as they are fed to the width measuring zone by a conventional conveyor system.

In the past, various kinds of measuring apparatuses have existed for measuring the width of rolled steel sheets. Each of such measuring systems have employed an optical system as the measuring means. Such prior art optical systems have generally included an elongated light source mounted upon a base portion of the conveyor system at the predetermined measuring zone and positioned beneath the steel sheet to be measured and perpendicular to the transferring direction of the same. A photoelectric transducer is positioned above the light source so that it will receive the light beam emanating from the light source as it comes over the opposite edges of the steel sheet whose width is to be measured. An image which reduces the width of the sheet is then focused upon the focus plane of the photoelectric transducer and scanned by a rotary scanner having slits located around the cylindrical body thereof. The photoelectric sensitive element of the photoelectric transducer will respond to the amplitude of the image passing through the scanner slits and will cause an electric output signal whose amplitude is proportional to the dimensions of the reduced image. The output signal of the photoelectric transducer is then employed as the measured value of the width of the steel sheets.

While the prior art optical system described above is somewhat satisfactory, it is impossible to measure the widths of the steel sheets with a high degree of accuracy, such as, in the 1 mm to 2 mm range because of the necessity of measuring the reduced images of the steel sheets.

For example, if the above described apparatus is used to successively measure the width of steel sheets having dimensions which are equal in width but vary in thickness, it can readily be seen that when the thicker sheet is positioned between the transducer and the light source of the measuring apparatus the image of the sheet to be focused on the focus plane of the transducer will be larger than when the thinner sheet in length is placed in the same position.

Thus, it is apparent that significant errors in the measurement resulting from the output of the transducer as a result of variation in the thicknesses of the steel sheets will occur.

Also in the past, in an attempt to reduce the aforesaid error, a pair of transducers similar to that of the above described example are mounted on an inversed screw mechanism so that it is possible to move the pair of transducers in opposite directions to each other by reversibly rotating the inversed screw. As such, by reversibly rotating the inversed screw or set screw, the transducers may be set to scan only near the side edge portions of the steel sheet to be measured.

Again, while somewhat satisfactory, because the pair of transducers are only located at the side edge portions of the steel sheet and therefore scan only the side edge portions, error is again introduced as a result of any increase in the sheet thickness.

Moreover, it has been found that the above-described arrangement also results in difficult operation in that the relative positions on the inversed screw rod of the pair of transducers have to be adjusted, by rotating the latter, every time steel sheets having different widths are fed to the inspecting position. Additionally, this extremely troublesome operation is not only complicated, but of great expense. Furthermore, with the above-described system, when the steel sheet to be measured is located at an extreme overcenter position between the pair of transducers, it should be apparent that an even greater error in width measurement will result.

SUMMARY OF THE INVENTION

Accordingly, it is a principal object of this invention to provide a new and improved unique apparatus for measuring the size of successively fed objects.

Another object of the invention is to provide a new and improved apparatus for automatically measuring the width of web materials with high accuracy and without the need of employing a reduced optical image as heretofore required.

Still another object of the invention is to provide a unique apparatus for automatically and precisely measuring the width of web materials irrespective of variations in the thickness thereof.

One other object of this invention is to provide a unique simple apparatus for measuring the width of web materials which is both reliable and inexpensive.

Briefly, in accordance with this invention, these and other objects are in one aspect attained by providing an elongated light source in a measuring zone, the length of the same being greater than the widths of the web materials to be measured. The light source is positioned at one side of the web material in a non-contact relation therebetween such that the lengthwise direction of the light source coincides with the widthwise direction of the web. A photoelectric transducer is provided at the other side of the web in a non-contact relation therebetween such that the transducer is allowed to move along the lengthwise direction of the light source when the measurement of the width of the web is made. A magnetic induction type pulse generator is provided and moves in accordance with movement of the photoelectric transducer such that both move together when the measurement of the width of the web is made. A magnetic scale member is provided and extends the entire length of movement of the magnetic induction type pulse generator. Magnetically recorded marks are finely distributed along the lengthwise direction of the scale and the surface having the magnetically recorded marks thereon is aligned with the magnetic induction type pulse generator. A counter is provided for counting during the period of time that the light beam, emanating from the light source, is interrupted due to the web whose width is to be measured. The counter, when in operation, will count the marks magnetically recorded on the magnetic scale member as the magnetic induction type pulse generator is moved therealong.

BRIEF DESCRIPTION OF THE DRAWINGS

The present invention can be more fully understood from the following detailed description when taken in connection with reference to the appended Drawings, wherein.

DETAILED DESCRIPTION OF THE PREFERRED EMBODIMENTS

Figure 1:
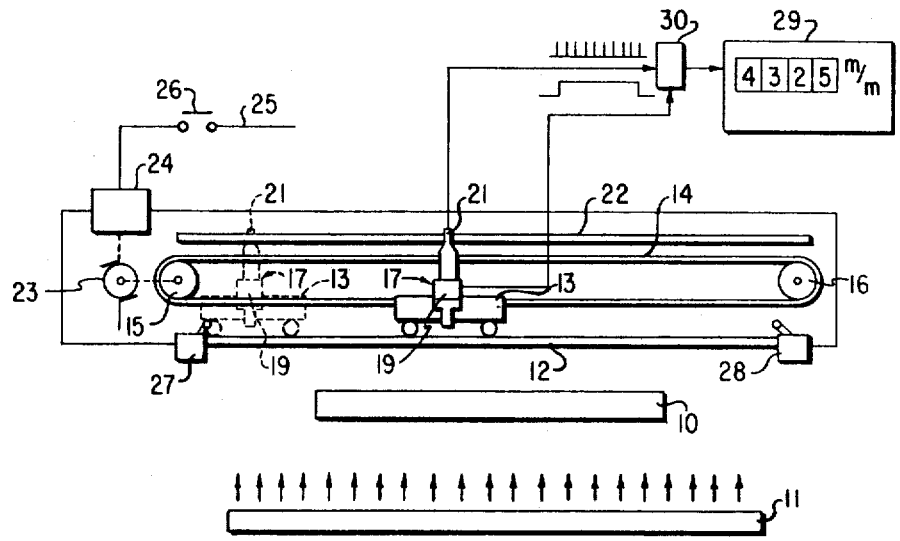
FIG. 1 is a schematic view of a preferred embodiment of the present invention.

Referring now to the Drawings, wherein like reference numerals designate identical, or corresponding parts throughout the several views, and more particularly to FIG. 1 thereof, wherein a steel sheet or web of material 10 is shown as having arrived at the inspecting zone where its width is to be measured. It should be understood that the steel sheet 10 moves past the inspecting zone in a direction perpendicular to the paper surface of the Drawing. In actual use, the steel sheet 10 will be carried by any suitable conveyor, but the same is not shown in the Drawing, since it is not a main part of the invention. An elongated light source 11 is provided and preferably includes an elongated fluorescent lamp beneath the steel sheet 10 such that the longitudinal axis thereof is placed in a crossed position relative to the feeding axis of the sheet material 10. The length of the light source may be such as to cover all of the widths of the steel sheets to be measured.

A guide rail 12 is provided above the steel sheet 10 and is in parallel relation to the light source. The guide rail 12 is selected to have a greater length than the light source 11. A carrier 13 is mounted on the rail 12 so as to be freely movable therealong. The carrier 13 is connected to opposite sides of a driving rope 14 which surrounds conventional pulleys 15 and 16. The pulleys 15 and 16 are rotatably pivoted near the opposite ends of the rail 12. A photoelectric transducer 17 explained hereinafter with reference to FIG. 3 is mounted on the carrier 13 for converting into an electrical signal any light impinging thereupon which emanates from the lamp 11.

Figure 3:
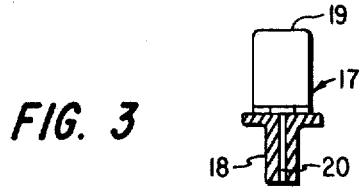
FIG. 3 is an enlarged view of a photoelectric transducer employed in the aforesaid embodiments; and, FIGS. 4, 5, 6, 7 and 8 are schematic views which respectively show alternative embodiments of an edge detector means for web materials in accordance with the present invention.

As is clearly shown in FIG. 3, the photoelectric transducer 17 includes a tubular light guide member 18 for receiving only the light beam which falls directly upon the photoelectric element 19. Preferably opening 20, which extends through the light guide 18, is provided and filled with an optically transparent material, such, for example, as an optical glass fiber, whereby dust or the like is prevented from interfering with the photoelectric element 19 and thereby injuring the transparency of the light beam.

A magnetic induction type pulse generator 21 is mounted on the carrier 13 such that it moves in accordance with any movement of the photoelectric transducer 17. The pulse generator 21 is basically a magnetic head similar to that used in a conventional tape recorder. There is also provided an elongated and magnetically recorded scale member 22 which extends through the entire travel span of the pulse generator 21 and is magnetically coupled therewith. On the magnetic base of the scale member 22, marks are magnetically recorded and finely distributed along the longitudinal direction thereof, such, for example, as in intervals of 0.05 mm.

In order to drive the carrier 13 with the photoelectric transducer 17 and pulse generator 21 mounted thereupon, there is provided a reversible electric motor 23 having a suitable brake means. The electric motor 23 is connected to the axle of the pulley 15 for reversibly rotating the same. A changeover switch means 24 is provided to reversibly energize the motor 23. The switch means 24 is in turn connected to an electric power source 25 through an electric contact 26 which is depressed to a closed position at the beginning of a measuring operation. The switch means 24 is controlled by a pair of limit switches 27 and 28 mounted on the opposite ends of the rail 12 in such a manner that when the carrier 13 arrives at the leftward end of the rail, the limit switch 27 will be operated to drive the motor 23 to move the carrier 13 rightward when the contact is in a closed position, and when the carrier 13 arrives at the rightward end of the rail, the limit switch 28 will be alternatively operated to drive the motor to drive the carrier leftwards when the contact is in the closed position.

To count selected pulses of those generated by the pulse generator 21, a counter 29 is provided and the same is responsive to any pulses generated in accordance with the gating of an AND circuit 30 to which the output of the pulse generator 21 is connected. The other input to the AND circuit 30 are the photoelectric signals which emanate from the photoelectric transducer 17 and the same function to open and close the AND gate in accordance with light impinging thereupon. The pulses from the generator 21 can be passed to the counter 29 through the AND gate only when the AND gate 31 is in an open state, namely, when a pulse from both the pulse generator 21 and the photoelectric transducer 17 is applied thereto.

In actual operation, it can be assumed that initially the carrier 13 with the photoelectric transducer 17 and the magnetic induction type generator 21 mounted thereon is positioned at a left side rest position (as shown with the phantom line). The electrical contact 26 will be in its open state and the limit switch 27 will be closed due to depression by the carrier 13. It now becomes possible to move the carrier 13 in a rightward direction each time the contact switch 26 is closed.

When a steel sheet 10 whose width is to be measured is positioned in the inspection zone, the contact 26 will be switched to a closed position. With contact switch 26 closed, the change-over switch 24 will close on one side, and the motor 23 will start to move the carrier 13 rightwards. The photoelectric transducer 17 will receive the light beam emanating from the light source 11 and an electric signal will thus be generated to cause AND gate 30 to close. An electric signal from the photoelectric transducer 17 will continue to maintain AND gate 30 in a closed position until the light beam entering into the light guide 18 is interrupted by the edge portion of the steel sheet 10 to be measured.

As soon as the light beam is interrupted by the sheet 10, the AND gate 30 will open and thereby allow the pulses emanating from the pulse generator 21 to pass through the AND gate 30. These pulses are then fed to counter 29 whereby the same are counted. This counting operation will continue until the AND gate 30 is again closed by an electric signal emanating from the photoelectric transducer 17. This will occur at the instant of time when the photoelectric transducer 17 just leaves the rightward edge portion of the steel sheet 10. Thus, when the light guide 18 leaves the rightward edge portion of the steel sheet 10 and the photoelectric transducer 17 again receives the light beam, the AND gate 30 will close and the counting operation of the counter will stop.

It should be readily understood that the total count in the counter 29 will now indicate the width of the steel sheet 10 to be measured.

After the counting operation has stopped, the carrier 13 will continue to move in the rightward direction until the rightward limit switch 28 is reached, at which time the carrier 13 will stop. At the stopping position of the carrier 13, limit switch 28 will be pushed down and change-over switch 24 will open the energization circuit of the motor 23 so as to move the carrier in a leftward direction until the motor 23 again comes under the control of the leftward limit switch 27.

Thus, the inspection of the width of the first steel sheet has been completed and the sheet 10 will be conveyed to an appropriate next station.

The first steel sheet will then be replaced by a second steel sheet whose width is to be inspected and for the second measurement when the contact 26 is closed the carrier 13 will travel from the right direction to the left direction as described above. The width of the second steel sheet will then be measured by means of the counter 29, and the carrier 13 will ultimately reach its initial position (shown in phantom at the left). The above-described operations will continue as the carrier 13 alternatively and repetitively changes directions as each steel sheet is successively fed to the inspection zone.

In accordance with the above-described preferred embodiment, it is possible to measure the width of a web of material, such as a steel sheet, with an extremely high accuracy, such, for example, with a tolerance of 0.05 mm, depending upon the distance between the distributed marks on the magnetic recorded scale 22. This unique accuracy results, since the reduced image apparatus for measuring a steel sheet in the past has been eliminated. The above-described accuracy is realized by the use of the elongated magnetized scale 22 which is located along substantially the whole travelling length of the magnetic induction type pulse generator 21.

It should further be understood that with the subject invention, even if the position of a steel sheet or web of material to be measured is greatly offset either in a right or left direction from the usual inspecting center position, that no error will result as in the heretofore existing apparatus, unless the steel sheet is positioned beyond either end of the rail.

Furthermore, with the subject invention, no error in the measured value indicated on the counter will result from thickness variations in the steel sheets, since the photoelectric transducer is simultaneously moved along the elongated magnetized scale with the magnetic induction type pulse generator.

Thus, it should be apparent that the apparatus for measuring widths of webs of material or steel sheets of the present invention as the same are successively fed to a measuring zone is readily realized and the same is simple in construction, reliable, and inexpensive.

Figure 2:
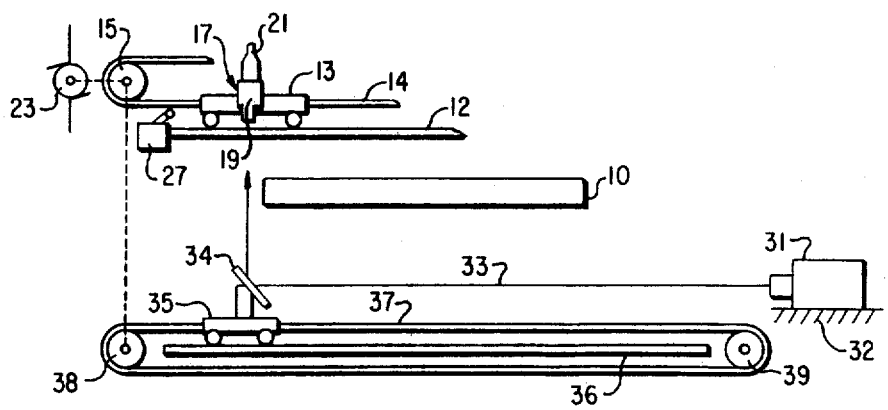
FIG. 2 is a similar view of another embodiment according to the invention, wherein a laser system is employed as the light source.

Referring now to FIG. 2, another embodiment of the present invention is shown as employing a laser source 31 as the light source instead of the elongated lamp 11 of FIG. 1. The laser source 31 is mounted upon a fixed base 32 and emits a laser beam 33 at a level even with the upper and lower surfaces of the web of material or steel sheet 10 to be measured.

In order to direct the laser beam 33 in an upward direction, a mirror 34 is provided and the same is mounted upon a second carrier 35. The second carrier 35 rides on a rail 36 and is also capable of moving freely in left and right directions. The second carrier 35 is connected to the opposite ends of a rope 37 which surrounds a pair of pulleys 38 and 39 which are rotatably pivoted near the opposite ends of the rail 36.

The second carrier 35 is located directly beneath the first carrier 13, and the upper and lower pulleys 15 and 38 are mechanically connected so as to be synchronously driven together by the reversible electric motor 23.

In operation, when the motor 23 rotates in a first direction both of the carriers 13 and 35 will synchronously travel in a rightward direction. Initially as the carriers 13 and 35 are moved in the leftward direction, the beam 33 will be received by the photoelectric transducer 17 and after conversion into an electrical signal will function to close the AND gate 30 as shown in FIG. 1. As soon as the laser beam 33 intercepts the leftward edge portion of the steel sheet 10, the photoelectric transducer 17 will cause another signal which will open the AND gate 30 and start the counting operation of the counter 29. The counting operation will continue until the laser beam 33 leaves the rightward edge portion of the steel sheet 10. At that time, the laser beam 33 will again be received by the photoelectric transducer 17 and the counter 29 will immediately stop its counting operation. The counter 29 will then digitally indicate the width of the steel sheet 10. After such a measuring operation, the carriers 13 and 35, upon reaching the rightward end of the rails 12 and 36, will cause depression of a limit switch (not shown) similar to the switch 28 of FIG. 1. The depression of the limit switch will cause the motor to stop and enable the next measuring operation to occur. It should be easily understood that the next measuring operation will be effected by a leftward motion of the carriers 13 and 35.

In accordance with this embodiment, because of the more exact parallelism of the laser light beams than that realized by ordinary light beams, more accurate width measurements may be readily obtained.

Figure 4:
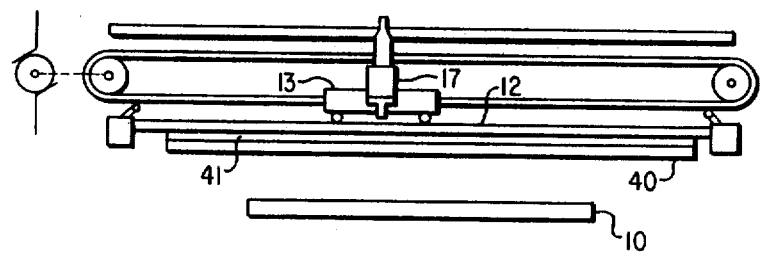

Referring now to FIG. 4, there is shown still another embodiment of this invention, wherein an elongated lamp 40 having a light shield 41 is mounted on the rail 12 so as to illuminate the upper surface of a polished steel sheet 10. It should be understood that in accordance with this embodiment, the sheet to be measured may be a stainless steel sheet, a glossy sheet made of synthetic resin, a plated sheet or the like. The sheet 10 will thereby reflect back the light beam towards the photoelectric transducer 17 and after the beam is converted into an electric signal will show the presence of the sheet 10.

Figure 5:
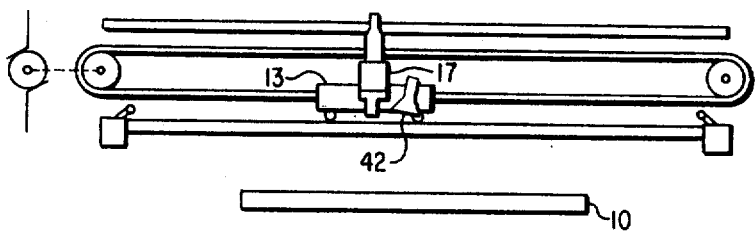

In accordance with still another embodiment of the present invention, FIG. 5 shows a spotlight 42 mounted upon the carrier 13 and the same will illuminate the upper surface of the sheet 10 as the same is moved with the carrier 13. The light beam will then be reflected from the upper surface of the sheet and directed onto the photoelectric transducer 17.

Figure 6:
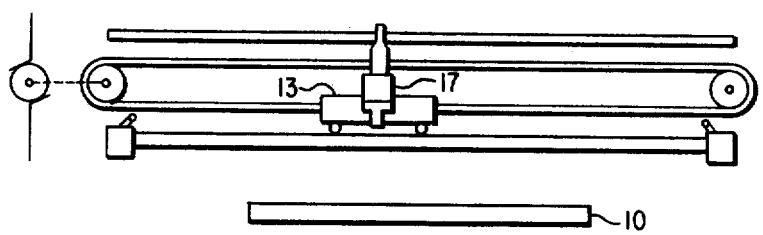

In accordance with still another alternative embodiment, FIG. 6 shows the measuring apparatus of the present invention without a lamp system for illuminating the steel sheet 10. The steel sheet is instead placed in a high temperature environment such that visible rays or non-visible infrared rays will be irradiated. The photoelectric transducer 17 upon receipt of rays will convert them into an electrical signal and thereby function to close the AND gate 30 as shown in FIG. 1.

Figure 7:
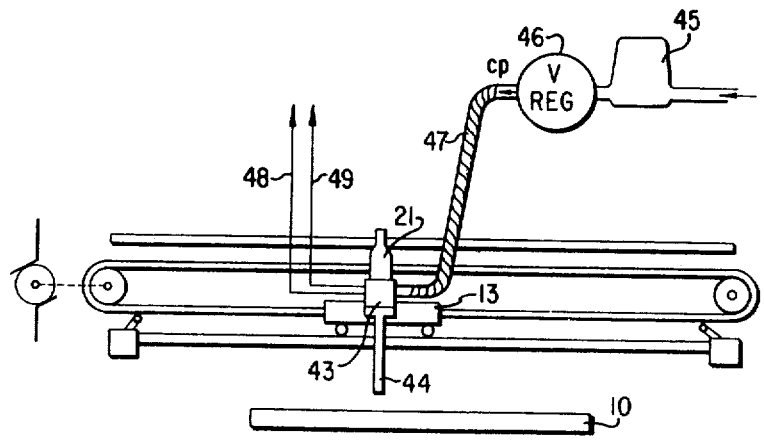

In another alternative embodiment, as shown in FIG. 7, an air pressure sensor 43 is mounted on the carrier 13 and the same includes an elongated nozzle 44 having an opening positioned near the upper surface of the steel sheet 10 to be measured. The sensor 43 is supplied with air having a relatively constant pressure level from a pressurized air reservoir 45 through a constant pressure outlet valve 46 and a flexible pipe 47. The air normally flows out the opening of the nozzle 44. When the opening of the nozzle is not near the surface of the steel sheet 10, the pressure detected by the sensor 43 will reduce to an amplitude that is incapable of operating a pressure switch mounted within the sensor 43. On the other hand, when the nozzle 44 moves directly over the upper surface of the steel sheet 10, the air pressure in the sensor 43 will rise to a higher and predetermined amplitude because of the increase in resistance near the opening of the nozzle 44. The pressure switch within the sensor 43 will then operate and allow the counter (See FIG. 1) to begin counting in accordance therewith. When the pressure switch is in a closed position, the operational signal therefrom will be conducted through a signal line 48 to the AND gate (See FIG. 1). The pulses emanating from the pulse generator 21 will now be conducted to the counter (See FIG. 1) through the AND gate such that the desired measurement can be obtained.

Figure 8:
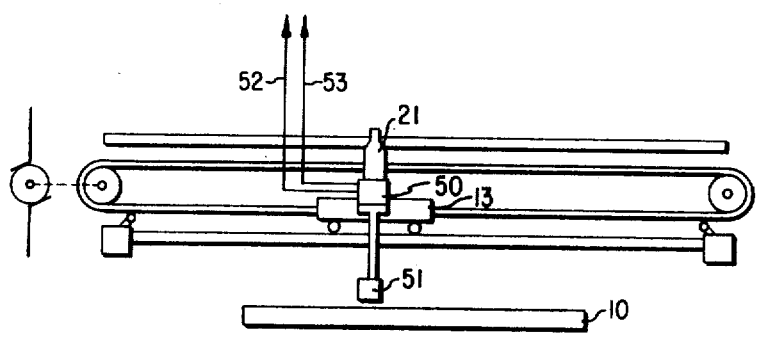

FIG. 8 shows one further embodiment of this invention, wherein a sensor 50 having a probe 51 attached thereto is mounted on the carrier 13 with the probe 51 positioned near the upper surface of the steel sheet 10. The probe 51 may be an inductive detector, a capacitive detector, or the like.

It should be understood that when the probe 51 reaches near the side portions of the steel sheet 10 that abrupt variations of inductance or capacitance, as the case may be, will occur in the probe. The signal change is supplied by circuit 52 to open the AND gate (See FIG. 1). The pulses emanating from the pulse generator 21 are then conducted to the counter (See FIG. 1) through circuit 53 and the AND gate such that the desired measurement can be obtained.

Obviously, numerous modifications and variations of the present invention are possible in light of the above teachings. For example, in all of the embodiments set forth above, the carrier, the magnetic recorded scale, the magnetic induction type pulse generator and the driving mechanism for these elements are located above the steel sheet or web material to be measured. Obviously, these elements may be provided beneath the sheet to be measured. Moreover, it should be apparent that the constant pressure outlet valve and the pressurized air reservoir of FIG. 7 can be directly mounted on the carrier, and as such any suitable air compressor could be mounted on the carrier and be energized from a trolley wire system or the like extending across the measuring device. Though the invention has been explained by way of example for measuring the width of a sheet or web material, it should be apparent that the invention can be readily adapted for measuring the length and thickness of the objects. It is therefore to be understood that within the scope of the teachings herein and the appended Claims, the invention may be practiced otherwise than as specifically described herein.

What is claimed is:

1. An apparatus for measuring the dimensions of objects comprising:
   an elongated magnetically graduated scale having magnetically recorded marks thereon with a predetermined interval between adjacent ones of said marks and having a length larger than the dimensions of the objects to be measured;
   a first carrier mounted on a fixed base, said first carrier being capable of motion along said scale;

a magnetic induction type pulse generator mounted on said first carrier, said pulse generator being magnetically coupled to said scale to pick up marks recorded thereon;

detecting means mounted on said first carrier to generate an electric signal in response to the existence of said object, said detecting means including: a photoelectric transducer mounted on said first carrier, a laser source mounted on a fixed base, said transducer and laser source being respectively located at opposite surfaces of said objects to be measured, a second carrier mounted on a fixed base, said second carrier being capable of movement along said scale with said first carrier upon which said photoelectric transducer is mounted, and a mirror mounted on said second carrier to direct a laser beam emanating from said laser source upon said transducer; and, means for counting said selected ones of said recorded marks of said scale in accordance with the electrical signal of said detecting means which is responsive to the existence of said objects to be measured.

2. An apparatus for measuring the dimensions of objects according to claim 1, wherein said photoelectric transducer has an elongated tubular light guide for receiving only the light beam from said laser source directed to said transducer.

3. An apparatus for measuring the dimensions of objects according to claim 1, wherein switching means are provided for moving said first carrier from a given side of said objects to be measured to the other side of said objects to be measured during a measuring operation such that for a succeeding measuring operation said first carrier is moved from the other side of said objects to be measured back to said first mentioned given side of said objects.

4. An apparatus for measuring the dimensions of objects according to claim 1, wherein is further included an AND gate, the inputs to said AND gate being said electric signal generated by said detecting means and the pulses from said pulses generator as it passes a recorded mark such that said selected ones of said recorded marks will be counted only when said first carrier passes across said objects to be measured.

* * * * *